United States Patent [19]
Barks

[11] Patent Number: 6,159,276
[45] Date of Patent: Dec. 12, 2000

[54] SEALING SYSTEM FOR COMBUSTIBLE ENGINES AND THE LIKE

[75] Inventor: Robert W. Barks, New Castle, Del.

[73] Assignee: SCIX, LLC, Bensalem, Pa.

[21] Appl. No.: 09/227,440

[22] Filed: Jan. 8, 1999

[51] Int. Cl.$^7$ ....................................................... C09K 3/10
[52] U.S. Cl. .................................. 106/33; 252/72; 252/73
[58] Field of Search ................................ 106/33; 252/72, 252/73

[56] References Cited

U.S. PATENT DOCUMENTS

| | | |
|---|---|---|
| 2,129,459 | 9/1938 | Benoit . |
| 2,315,321 | 3/1943 | Lloyd . |
| 2,729,568 | 1/1956 | Metcalf . |
| 2,885,296 | 5/1959 | Welden . |
| 3,042,620 | 7/1962 | Dry . |
| 3,417,018 | 12/1968 | Burns . |
| 3,433,655 | 3/1969 | Nugent . |
| 3,644,208 | 2/1972 | Krueger . |
| 3,740,337 | 6/1973 | Sommers . |
| 3,984,507 | 10/1976 | Miller . |
| 4,524,159 | 6/1985 | Barber . |
| 4,708,195 | 11/1987 | Barks . |
| 4,713,114 | 12/1987 | Smith . |
| 4,765,629 | 8/1988 | Barks . |
| 4,765,630 | 8/1988 | Barks . |
| 4,973,360 | 11/1990 | Satas . |
| 5,282,895 | 2/1994 | Phillips . |
| 5,391,224 | 2/1995 | Pasuit . |

FOREIGN PATENT DOCUMENTS 362227968   10/1987   Japan .

*Primary Examiner*—Paul Marcantoni
*Attorney, Agent, or Firm*—Schnader Harrison Segal and Lewis LLP

[57] ABSTRACT

A composition for sealing warped or cracked engine coolant systems is provided comprising an aqueous silicate mixture comprising 50–80% sodium silicate, based on the total amount of silicates in the mixture, and 50–20% potassium silicate, based on said total amount of silicates in the mixture; the total amount of silicates comprising about 40–50% of said mixture; a glycol in an amount of at least 10% by volume of the composition; and the balance being water. A method for sealing warped or cracked engine cooling systems is also provided.

10 Claims, No Drawings

SEALING SYSTEM FOR COMBUSTIBLE ENGINES AND THE LIKE

BACKGROUND OF THE INVENTION

This invention relates to a composition for combustible engines and the like and particularly for sealing cracks in such devices as heating cores, freeze plugs radiators, cracked or warped heads and blown head gaskets. The most common approach generally taken to repair such cracks is to utilize solid particles carried by a liquid for conveying the particles to the cracks. In this conventional approach the solid particles act as plugs for sealing the cracks. A difficulty with this conventional approach is that it is applicable only to large cracks with varying effectiveness but is not effective with respect to very small cracks which are too small for the particles to enter. Another disadvantage with such conventional techniques is that such techniques operate too slowly.

A variation of the above-conventional techniques which have been considered is to completely omit the solid particles as the sealant and instead to use as the sealant a pure liquid. In this variation the liquid flows into all cracks and openings whether large or minute. The components of the liquid are such that upon the application of heat, such as by starting the engine, the liquid solidifies and thereby is intended to close or seal the cracks.

OBJECTS OF THE INVENTION

An object of this invention is to provide an improved sealing system which has the advantages but not the drawbacks of the above systems.

A further object of this invention is to provide such a sealing system which provides sufficient strength and durability to effectively withstand pressure that might be applied.

A still further object of this invention is to provide such a system which is characterized by its quickness in sealing cracks regardless of the size of the cracks.

SUMMARY OF THE INVENTION

In accordance with one embodiment of this invention the sealing system includes a liquid carrier for solid particles. Unlike the conventional system, however, the liquid carrier itself is capable of solidification. Thus, the invention utilizes the advantages of the prior techniques by initially closing large cracks and openings with the solid particles and utilizing the liquid to fill the tiny cracks and to complete the filling of the large cracks upon solidification of the liquid.

In another embodiment of this invention, the sealant may comprise a mixture of sodium silicate, potassium silicate, a glycol, and particulates, with optional coloring agents and preservatives.

DETAILED DESCRIPTION

In its broadest aspect the invention is directed to providing a composition for effectively sealing holes or cracks in engine cooling systems and the like, and to seal warped engine heads, and the like. The invention provides a liquid composition which may be solidified to seal cracks, holes and warped areas. The composition may also include pumice particles or metal filings, coloring agents and preservatives. The solid particles function as bonding agents to which the liquid becomes attached while solidifying. The solidification of the carrier can take place in any suitable manner. For example, a reactant or catalyst can be added to the liquid carrier immediately after time of insertion and thereby utilize a chemical reaction to cause solidification. In the preferred form of this invention, however, the solidification takes place as a result of heat being applied to the liquid carrier.

By utilizing heat to cause solidification the invention is particularly useful for sealing cracks or holes in a combustible engine in its cooling system. For example, the invention may be utilized for sealing cracked or warped heads or blown head gaskets in an engine or for sealing heating cores, freeze plugs, radiators or in the cooling system. The engine or cooling system may be of a gasoline or diesel type such as those used in vehicles such as cars, trucks, boats, and the like.

In this invention, a liquid part of the sealant is obtained by mixing, sodium silicate and potassium silicate in liquid form, to which is added a glycol and water. The liquid may also contain various coloring agents and preservatives. In some applications, the liquid may also contain particulates such as pumice or corrosion-resistant metal filings.

The silicates of the present composition are comprised of potassium silicate and sodium silicate. The silicates are high grade silicates and may be mixed in specific proportions. For example, sodium silicate may be present in 10–90% based on the total amount of the silicates, more preferably 50–80% based on the total amount of silicates the balance of the silicates being comprised of potassium silicate. The total amount of silicates comprise about 40–50% of the aqueous silicate mixture.

Sodium silicate or water glass may be pure sodium metasilicate or mixtures of sodium metasilicate with two other silicates. It is available as granular, crystals or 40% Baume solution. The N Grade liquid is preferred.

Sodium silicate is a general term applied to a group of materials. They are compositions in which sodium oxide is combined with various amounts of silica usually with some water. They differ in $SiO_2/Na_2O$ ratio and in the amount of water attached. Sodium silicates are available in $SiO_2/Na_2O$ from 0.5 to 4. The number of water molecules per one molecule of sodium silicate may vary from 0 to 10.5.

The silicate mixture of the present invention is provided in liquid form. The potassium silicate of the present invention may be $K_2SiO_3$, $K_2Si_2O_5$, and/or $K_2Si_4O_9$. Preferably, the potassium silicate is present in liquid form, such as solublized in water. The potassium silicate of the invention may be in a 40% solution, or any soluble form commonly available. The amount of potassium silicate suitable for use in the present invention is from about 10–90% based an the total amount of silicates, more preferably, 20–50% based on the total amount of silicates. The balance being comprised of sodium silicate.

The composition also contains a glycol in water. Suitable glycols for use in the invention include diethylene glycol, ethylene glycol, propylene glycol, dipropylene glycol, polyglycols, glycol ethers, and mixtures thereof. Of the glycols which may be used in the invention diethylene glycol is preferred. Glycols provide a composition with a low freezing point and lubrication for the water pump. A composition containing about 12–15 wt % glycol, for example, may be used in climates with temperatures down to about −10° F. (about −23° C.). In a preferred embodiment of the invention, the glycol component comprises 1–25 wt % of the composition. More preferably, the diethylene glycol and water comprises 5–25 wt % of the total composition. Most preferably, the diethylene glycol and water comprises 10–15 wt % of the total composition. The diethylene glycol is particularly advantageous since this additive allows for a cooler running system and helps the hardening effect of the sealant.

The composition may optionally contain particulates such as pumice or corrosion-resistant metal filings. The pumice particles should be small enough to pass through a heating core of the engine in need of sealing. In general, pumice is added to the composition for heavy-duty applications such as for sealing warped heads. Pumice particles are preferably added in an amount of about 1 teaspoon per pint. Metal filings, such as brass filings, copper filings, or aluminum filings may also be used in the composition. The metal filings have the advantage of not rusting. Metal filings should also be sized to pass through the heating core of the engine to be treated. The amount of metal filings is preferably about ½ of a level teaspoon per pint.

The invention may also comprise coloring agents and preservatives.

In a preferred embodiment of the invention, approximately 5.3 fluid ounces (about 150 mL) of sodium silicate solution is mixed with about 2 fluid ounces (about 59 mL) of potassium silicate. To this mixture, 2 fluid ounces (about 59 mL) of a glycol, such as diethylene glycol or ethylene glycol are added and 6.7 fluid ounces (about 205 mL) of water complete the 16 ounce (about 473 mL) solution. If desired, pumice (1 tsp) or metal filings (½ tsp) may be added for severe cracks, such as for sealing warped heads and blown head gaskets. The viscosity of the product resembles a light grade motor oil. This final mixture is then bottled in an amount intended for single use, or multiple uses. For single use bottles, the amount of the composition is preferably about 1 pint (473 mL). This final mixture is added to the cooling system of a car, for instance.

The cooling system of a modern car has 10 to 20 quarts (9.5 to 19 L) coolant capacity. The mixture within the cooling system is, therefore, from about 2.5 to 5% silicate by volume.

It is understood that the invention may be practiced with other amounts of these materials or with the substitution of other materials. The preferred example, however, is particularly suitable because it results in solidification quickly taking place upon the reaching of the predetermined temperature. For example, when a temperature of about 150–190° F. (about 65–88° C.) is reached, solidification takes place in as little as about 5–10 seconds.

Advantageously, the high temperature necessary for solidification is obtained by starting the engine to thereby heat the engine. In order to use the composition to substantially seal cracks in an engine coolant system and to seal warped heads, the sealant is preferably poured into a cold radiator so that by the time the engine is turned on the sealant has already flowed into the block and filled the cracks. Preferably, the thermostat is removed when using the composition. Once the composition has been added to the coolant system and allowed to flow into the block, the engine is started to allow the engine to warm up. The warmth of the engine allows the composition to seal gaps, spaces and cracks. After the leaking stops, the engine should be stopped and allowed to cool. The sealant has now formed a substantially permanent barrier and the leak is cured.

In many cases, leaks can be detected when the engine is running. Visible vapor may come from the exhaust. A warped head or broken block may allow coolant to leave the block in a visible stream or drops. Scaling takes about ten minutes and may usually be visibly confirmed by the absence of the vapor or liquid previously noticed.

If desired, a slightly larger quantity of water can be used. However, the mixture of the water and silicates in the amounts indicated gives best results. It is preferred that the water and silicates are mixed together before being mixed with the glycol because the glycol will promote immediate solidification. If solid particles are included, it is possible to seal leaks at temperatures less than about 37° C. with this mixture.

The invention is characterized by a seal having great strength and integrity sufficient to withstand the normal pressures to which it would be subjected. A particularly great advantage is the quickness or speed in which the sealing action takes place. A further advantage is the ability of the sealant to penetrate tiny cracks and thereby prevent such cracks from getting larger.

In general, the invention applies to sealing any type of cracks wherein liquid may flow into the cracks. As noted above, such cracks would then be effectively sealed in a rapid period of time. The cracks may be in combustible engine cooling systems or may be in other devices such as home or building heating systems.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

An advantage of this variation is that it permits the sealing of cracks or leaks at lower temperatures than with the first embodiment. Additionally, the particular mixture of components which includes ethylene glycol permits the provision of anti-freeze which is ordinarily already in the engine to function as a source of the ethylene glycol.

The invention in its various embodiments thus provides a sealant which is particularly effective for cracks and leaks at various ranges of temperatures.

What is claimed is:

1. A composition for sealing warped or cracked engine coolant systems comprising:

(a) an aqueous silicate mixture comprising 10–90% by volume sodium silicate, based on a total amount of silicates in said mixture, and 90–10% by volume potassium silicate, based on said total amount of silicates in said mixture, said total amount of silicates comprising about 40–50% by volume of said mixture;

(b) a glycol in an amount of at least about 10% by volume of the composition; and the balance being water.

2. The composition of claim 1, wherein said glycol is selected from the group consisting of diethylene glycol, ethylene glycol, propylene glycol, dipropylene glycol, polyglycols, glycol ethers, and mixtures thereof.

3. The composition of claim 2, wherein said glycol is diethylene glycol.

4. The composition of claim 1, wherein said aqueous silicate mixture comprising 50–80% by volume sodium silicate, based on a total amount of silicates in said mixture, and 50–20% by volume potassium silicate, based on said total amount of silicates in said mixture.

5. The composition of claim 1, further comprising pumice particles sized to pass through a heating core of an cooling system to be scaled.

6. The composition of claim 5, wherein said pumice is present in an amount of about 10–20 g/L of the composition.

7. The composition of claim 1 further comprising at least one coloring agent.

8. The composition of claim 1, further comprising metal filings.

9. The composition of claim 8, wherein said metal filings are selected from the group consisting of copper filings, brass filings, silver filings, steel filings, and mixtures thereof.

10. The composition of claim 8, wherein said metal filings are present in an amount of about ½ tsp/pint of composition.

* * * * *